Patented Aug. 2, 1932

1,869,879

UNITED STATES PATENT OFFICE

OTTO BALZ AND WILHELM WAGNER, OF LUDWIGSHAFEN-ON-THE-RHINE, GERMANY

DECOMPOSITION OF CRUDE PHOSPHATES

No Drawing. Application filed December 24, 1930, Serial No. 504,644, and in Germany January 6, 1930.

The present invention relates to improvements in the conversion of crude phosphates into phosphates which are soluble in water and in citrates.

The conversion of crude phosphates by means of phosphoric acid into water-soluble phosphates, such as double super-phosphate, has hitherto been effected by allowing phosphoric acid of a concentration of more than 44° Bé. to act on the crude phosphate. When employing phosphoric acid of a lower concentration a complete conversion could only be obtained by heating the reaction mixture while evaporating water until the boiling temperature reached from 110° to 115° C. When employing a phosphoric acid of from about 36° to 37° Bé. strength, such as is obtained for example by treating crude phosphate with sulphuric acid in the presence of small amounts of metaphosphoric acid, the conversion of the crude phosphate, whether carried out at ordinary or at elevated temperature, only proceeds to the extent of from 55 to 60 per cent.

We have now found that crude phosphate is practically completely converted into phosphates which are soluble in water and in citrates with the aid of dilute phosphoric acid of at least 32° Bé. strength, as for example of from 35° to 42° Bé. strength, by carrying out the reaction in the presence of large amounts of water-soluble sulphates or chlorides of the alkali metals or of magnesium or of ammonium. The amount of the said salts should as a rule be at least 1000 kilograms of the salts for each 1000 litres of phosphoric acid of 33° or 35° Bé. strength and may be so high that the mixture of phosphoric acid and salt still forms a mobile suspension at 80° C.; thus, for example, as much as 7000 kilograms of ammonium sulphate may be used for each 1000 litres of phosphoric acid of 35° Bé. strength. It is preferable to stir the said salts, as for example ammonium sulphate, potassium chloride, sodium sulphate or potassium sulphate or mixtures of these salts or natural potassium salts such as kainite or schonite into the amount of phosphoric acid necessary to convert the crude phosphate into monocalcium phosphate, the whole then being heated to from about 80° to 90° C. and the crude phosphate introduced. No further supply of heat is necessary during or after the reaction. After a short time the conversion is completed and a product is obtained which is more or less dry depending on the nature and amount of the salt employed, and the phosphoric acid content of which product is soluble in water and in citrates to the extent of from 98 to 99 per cent. Thus, a rather dry product is obtained when employing ammonium sulphate, whereas the mass remains moist when adding potassium chloride or potassium sulphate.

When employing the said additional salts, no greater amounts of the dilute phosphoric acid, the concentration of which is not higher than 42° Bé. and which is obtained for example by the conversion of crude phosphate with sulphuric acid without a special previous concentration is necessary than when employing concentrated phosphoric acid of more than 44° Bé.

Contrasted with the conversion of crude phosphate by means of concentrated phosphoric acid, the conversion according to the present invention saves the not inconsiderable cost of the concentration of the dilute acid. By adding further water-soluble salts in addition to those added in the decomposition, especially those having fertilizing properties such as nitrogen or potassium salts, good homogeneous mixed fertilizers may be prepared in a very simple and inexpensive manner. The amounts of all the water-soluble salts added are preferably selected so that after the reaction, products are obtained the fertilizing components of which are in certain definite proportions. Similar to double superphosphate, these resulting products are only slightly acid and may be neutralized to a greater or less extent in a very simple manner by leading gaseous ammonia thereover, for example in a rotary drum. Depending on the degree of the neutralization, these neutralized products contain a part of the phosphoric acid in a form in which it is insoluble in water, but readily soluble in citrates. Moist products may be dried in a simple manner directly in a rotary drum or after admixture with products which are already dry.

The following examples will further illustrate the nature of this invention, but the invention is not restricted to these examples.

*Example 1*

590 kilograms of ammonium sulphate are introduced into 230 litres of phosphoric acid of about 35° Bé. strength and the whole is heated to from about 80° to 85° C. After interrupting the heating, 100 kilograms of crude phosphate are added to this hot reaction liquid while stirring and the reaction proceeds with a fairly strong formation of foam. After several hours the reaction mass becomes fairly solid, when the reaction is complete. The dried product contains 15 per cent of N, 15 per cent of total $P_2O_5$ of which 14.8 per cent is soluble in citrates and 14.6 per cent is soluble in water.

*Example 2*

590 kilograms of ammonium sulphate and 270 kilograms of potassium chloride having a content of from 56 to 57 per cent of $K_2O$ are introduced into 230 litres of phosphoric acid of 35° Bé. strength and the whole is heated to from about 80° to 85° C. 100 kilograms of finely ground morocco phosphate are then stirred into this hot reaction solution. The reaction, which proceeds with a fairly vigorous formation of foam, is completed after several hours and a product is obtained containing about 8 per cent of moisture. After drying, the product contains 11.75 per cent of total $P_2O_5$, 11.75 per cent of N and about 14.5 per cent of $K_2O$. The total phosphoric acid is soluble in citrates to the extent of from about 98 to 99 per cent and in water to the extent of from 96 to 98 per cent.

*Example 3*

324 kilograms of potassium sulphate are introduced into 185 litres of phosphoric acid of about 40° Bé. strength and the whole is heated to about 80° to 90° C. Without further heating 100 kilograms of finely ground morocco phosphate are slowly introduced into the hot reaction solution and the reaction proceeds with a fairly vigorous formation of foam. The reaction is completed after from 1 to 2 hours and a product is obtained which has a viscous consistency even at room temperature. In order to convert the product into a dry state it is mixed with a product which has already been dried or with other dry salts, as for example ammonium sulphate or ammonium chloride. The mixture is dried by means of hot gases in a rotary drum. The resulting product contains the phosphoric acid to the extent of from 98 to 99 per cent in a form in which it is soluble in water and in citrates.

*Example 4*

5270 kilograms of ammonium sulphate are introduced into 2300 litres of phosphoric acid of 35° Bé. strength. The suspension is heated to about 80° C. and 1000 kilograms of morocco phosphate are introduced, while stirring, without further heating. The reaction proceeds with a vigorous formation of foam and is complete after about half an hour. The resulting mass is treated with gaseous ammonia, until a sample when titrated with caustic alkali solution, requires for neutralization about two thirds of the amount of lye which would be necessary if the product consisted of the diphosphate.

The resulting product is mixed with 2700 kilograms of potassium chloride and dried. A mixed fertilizer is obtained which contains about 11.75 per cent of nitrogen, 11.75 per cent of $P_2O_5$ and 14.5 per cent of $K_2O$. About 75 per cent of the total phosphoric acid is soluble in water, and the remainder, with the exception of 2 to 3 per cent, is soluble in citrates.

*Example 5*

370 kilograms of ammonium sulphate and 270 kilograms of potassium chloride are added to 230 liters of phosphoric acid of 35° Bé. strength, and the whole is heated to between 80° and 85° C. 100 kilograms of finely ground morocco phosphate are then stirred into the resulting hot solution. The reaction proceeds with a fairly vigorous formation of foam and is complete after a few hours. The resulting product is dried and then treated with gaseous ammonia in a revolving tube, until its hydrogen ion concentration is between the transition points of methyl orange and cresol red. The resulting product contains 11.75 per cent of $P_2O_5$ (11.7 per cent being soluble in citrates and 9.5 per cent being soluble in water), 11.75 per cent of nitrogen and 14.5 per cent of $K_2O$.

What we claim is:—

1. The process of decomposing crude phosphates which comprises acting with phosphoric acid of between about 32° and 42° Bé. strength on a crude phosphate in the presence of a salt selected from the group consisting of the sulphates and chlorides of the alkali metals (including ammonium) and magnesium, the said salt being employed in an amount of at least 1000 kilograms for each 1000 litres of phosphoric acid of about 35° Bé. strength.

2. The process of decomposing crude phosphates which comprises acting with phosphoric acid of between about 35° and 42° Bé. strength on a crude phosphate in the presence of a salt selected from the group consisting of the sulphates and chlorides of the alkali metals (including ammonium) and magnesium, the said salt being employed in an amount of at least 1000 kilograms for each 1000 litres of phosphoric acid of about 35° Bé. strength.

3. The process of decomposing crude phosphates which comprises acting with phosphoric acid of between about 32° and 42° Bé. strength on a crude phosphate in the presence of ammonium sulphate in an amout of at least 1000 kilograms for each 1000 litres of phosphoric acid of about 35° Bé. strength.

4. The process of decomposing crude phosphates which comprises acting with phosphoric acid of between about 32° and 42° Bé. strength on a crude phosphate in the presence of potassium chloride in an amout of at least 1000 kilograms for each 1000 litres of phosphoric acid of about 35° Bé. strength.

5. The process of decomposing crude phosphates which comprises acting with phosphoric acid of between about 32° and 42° Bé. strength on a crude phosphate in the presence of ammonium sulphate and potassium chloride in an amount of at least 1000 kilograms for each 1000 litres of phosphoric acid of about 35° Bé. strength.

6. The process of decomposing crude phosphates which comprises acting with phosphoric acid of between about 32° and 42° Bé. strength on a crude phosphate in the presence of ammonium sulphate and potassium chloride in an amount of at least 1000 kilograms for each 1000 litres of phosphoric acid of about 35° Bé. strength, and acting on the resulting product with gaseous ammonia.

7. The process of decomposing crude phosphates which comprises acting with phosphoric acid of about 35° Bé. strength at between 80° and 85° C. on a crude phosphate in the presence of a salt selected from the group consisting of the sulphates and chlorides of a metal selected from the group consisting of the alkali metals ammonia and magnesium, the said salt being employed in an amount of at least 1000 kilograms for each 1000 litres of phosphoric acid of about 35° Bé. strength.

8. The process of decomposing crude phosphates which comprises acting with phosphoric acid of about 35° Bé. strength at between 80° and 85° C. on a crude phosphate in the presence of ammonium sulphate and potassium chloride in an amount of at least 1000 kilograms for each 1000 litres of phosphoric acid of about 35° Bé. strength, and acting on the resulting product with gaseous ammonia.

In testimony whereof we have hereunto set our hands.

OTTO BALZ.
WILHELM WAGNER.